US009421947B2

(12) United States Patent
Wilgosz

(10) Patent No.: US 9,421,947 B2
(45) Date of Patent: Aug. 23, 2016

(54) WINDSHIELD WIPER WITH ICE SCRAPER ATTATCHMENT

(71) Applicant: Robert Wilgosz, Mantua, NJ (US)

(72) Inventor: Robert Wilgosz, Mantua, NJ (US)

( * ) Notice: Subject to any disclaimer, the term of this patent is extended or adjusted under 35 U.S.C. 154(b) by 205 days.

(21) Appl. No.: 14/331,324

(22) Filed: Jul. 15, 2014

(65) Prior Publication Data

US 2016/0016540 A1    Jan. 21, 2016

(51) Int. Cl.
*B60S 1/38*    (2006.01)

(52) U.S. Cl.
CPC ............... *B60S 1/38* (2013.01); *B60S 1/3801* (2013.01); *B60S 2001/3827* (2013.01); *B60S 2001/3832* (2013.01)

(58) Field of Classification Search
CPC ............. B60S 1/38; B60S 2001/3827; B60S 2001/3837; B60S 1/3801
USPC .............. 15/250.31, 250.36, 250.37, 250.001
See application file for complete search history.

(56) References Cited

U.S. PATENT DOCUMENTS

| | | | | |
|---|---|---|---|---|
| 1,339,241 A * | 5/1920 | Tripp | .................. | B60S 1/14 15/250.28 |
| 2,086,453 A * | 7/1937 | Ward | .................. | B60S 1/38 15/250.32 |
| 2,583,710 A * | 1/1952 | Scinta | .................. | B60S 1/38 15/245 |
| 3,021,548 A * | 2/1962 | Stoller | .................. | B60S 1/38 15/246 |
| 3,199,563 A * | 8/1965 | Forrest | .................. | B60S 1/0491 15/246 |
| 3,828,388 A * | 8/1974 | Fuhr | .................. | B60S 1/38 15/236.02 |
| 4,030,159 A * | 6/1977 | Centoducati | .......... | B60S 1/3801 15/250.48 |
| 5,732,436 A * | 3/1998 | Feigenbaum | ............. | B60S 1/38 15/250.41 |
| 6,070,287 A * | 6/2000 | Kornegay | ................. | B60S 1/38 15/247 |
| 6,327,738 B1 * | 12/2001 | Lewis | .................. | B60S 1/38 15/250.001 |
| 8,104,136 B2 * | 1/2012 | Carangelo | ............. | B60S 1/3801 15/250.361 |
| 8,156,606 B2 * | 4/2012 | Guttillo | .................. | B60S 1/38 15/245 |
| 2005/0235448 A1 * | 10/2005 | Richard | ................. | B60S 1/0491 15/257.01 |
| 2013/0036570 A1 * | 2/2013 | Hartman | .................. | B60S 1/487 15/250.31 |

* cited by examiner

*Primary Examiner* — Michael Jennings
(74) *Attorney, Agent, or Firm* — Stuart M. Goldstein

(57) ABSTRACT

A windshield wiper has a wiper arm with a window clearing blade and an ice scraper component located above the blade. The outer edges of the blade and scraper component are curved, so as to be configured to the shape of the windshield of the vehicle. Wing nut and screw attachment means allows the scraper component to be slideable between a position in which the scraper component is slid forward of the blade and contacts the windshield to perform its ice clearing function and a second position in which it is retracted away from the windshield of a vehicle to allow the blade to perform its water clearing function.

15 Claims, 3 Drawing Sheets

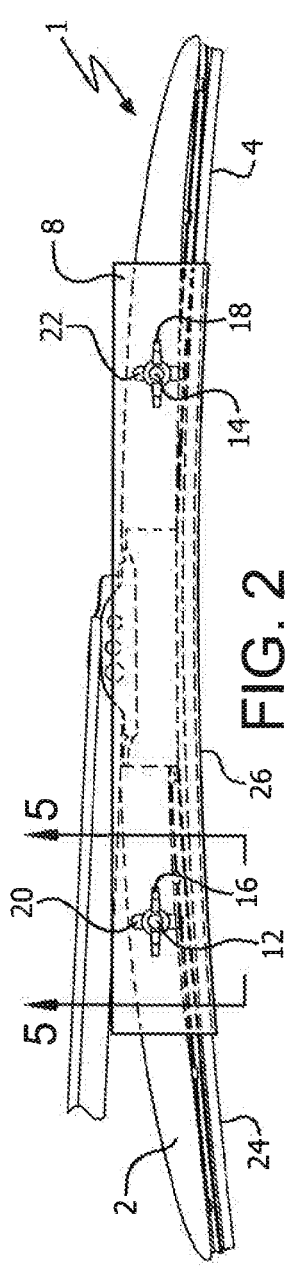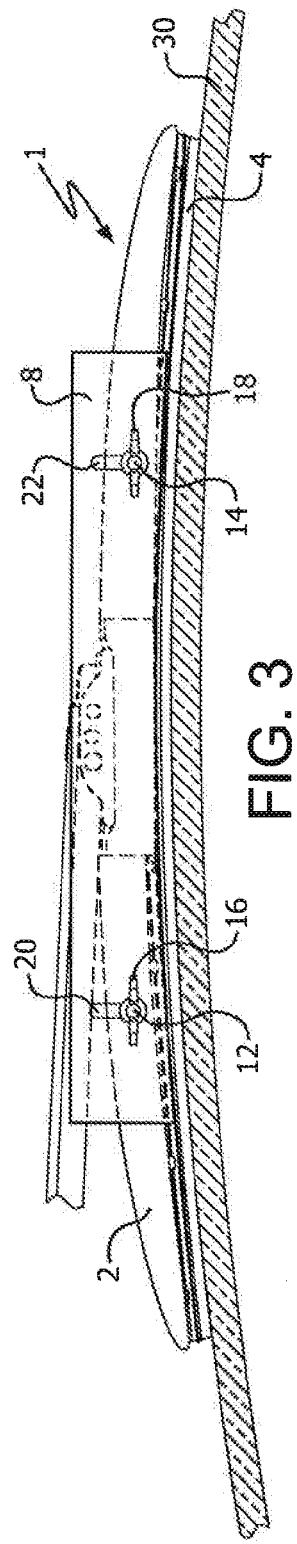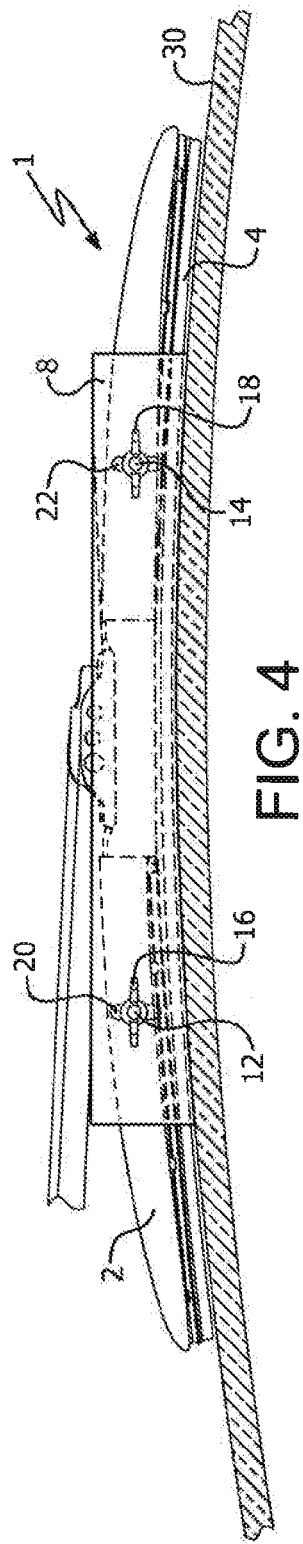

WINDSHIELD WIPER WITH ICE SCRAPER ATTATCHMENT

BACKGROUND OF THE INVENTION

The use of windshield wipers is critical to ensuring that rain, dew, and other forms of liquid moisture are efficiently and effectively removed from the windshield of vehicles. However, when ice, hard packed snow, or other frozen precipitation forms on windshields, commonly used windshield wipers, with their resilient, flexible rubber blades, are ineffective. In fact, the use of these wipers on ice usually results in damaging of the blades.

Various attempts have been made to connect ice scraper elements to windshield wipers. These prior wiper systems have proven to be either ineffective in removing frozen precipitation from windshields or impractical in that they are difficult to effectively attach to existing wipers. Other prior wiper/scrapers are complex devices which utilize multiple parts, making them expensive to manufacture and, inevitably, to replace.

SUMMARY OF THE INVENTION

It is thus the object of the present invention to provide a windshield wiper with ice scraper attachment which overcomes the disadvantages and limitations of prior windshield wipers and windshield wiper systems.

It is the object of the present invention to provide a windshield wiper which effectively serves not only to remove water from the windshield, but which also can easily and simply be converted to an ice scraper.

It is another object of the present invention to provide a windshield wiper having an ice scraper which can be slideably adjusted outward toward the windshield of a vehicle, when needed, to effectively and efficiently remove ice, hard packed snow, and other frozen precipitation from the windshield.

It is a further object of the present invention to provide a windshield wiper which can be adjustably retracted away from the windshield when it is not needed, in order to allow its wiper blade to perform the windshield water clearing function.

It is another object of the present invention to provide a windshield wiper which consists of only a few parts and thus is inexpensive to manufacture and less susceptible to requiring repair.

These and other objects are accomplished by the present invention, a windshield wiper with a wiper arm having a window clearing blade and an ice scraper component located above the blade. The outer edges of the blade and scraper component are curved, so as to be configured to the shape of the windshield of the vehicle. Wing nut and screw attachment means allows the scraper component to be slideable between a position in which the scraper component is slid forward of the blade and contacts the windshield to perform its ice clearing function and a second position in which it is retracted away from the windshield of a vehicle to allow the blade to perform its water clearing function.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

BRIEF DESCRIPTION OF THE DRAWINGS

FIG. 2 is a top view of the windshield wiper of the present invention.

FIG. 3 is a top view of the windshield wiper of the present invention located on a vehicle windshield, and in position to perform its water clearing function.

FIG. 4 is a top view of the windshield wiper of the present invention located on a vehicle windshield, and in position to perform its ice scraping function.

DETAILED DESCRIPTION OF THE INVENTION

Figure 1:
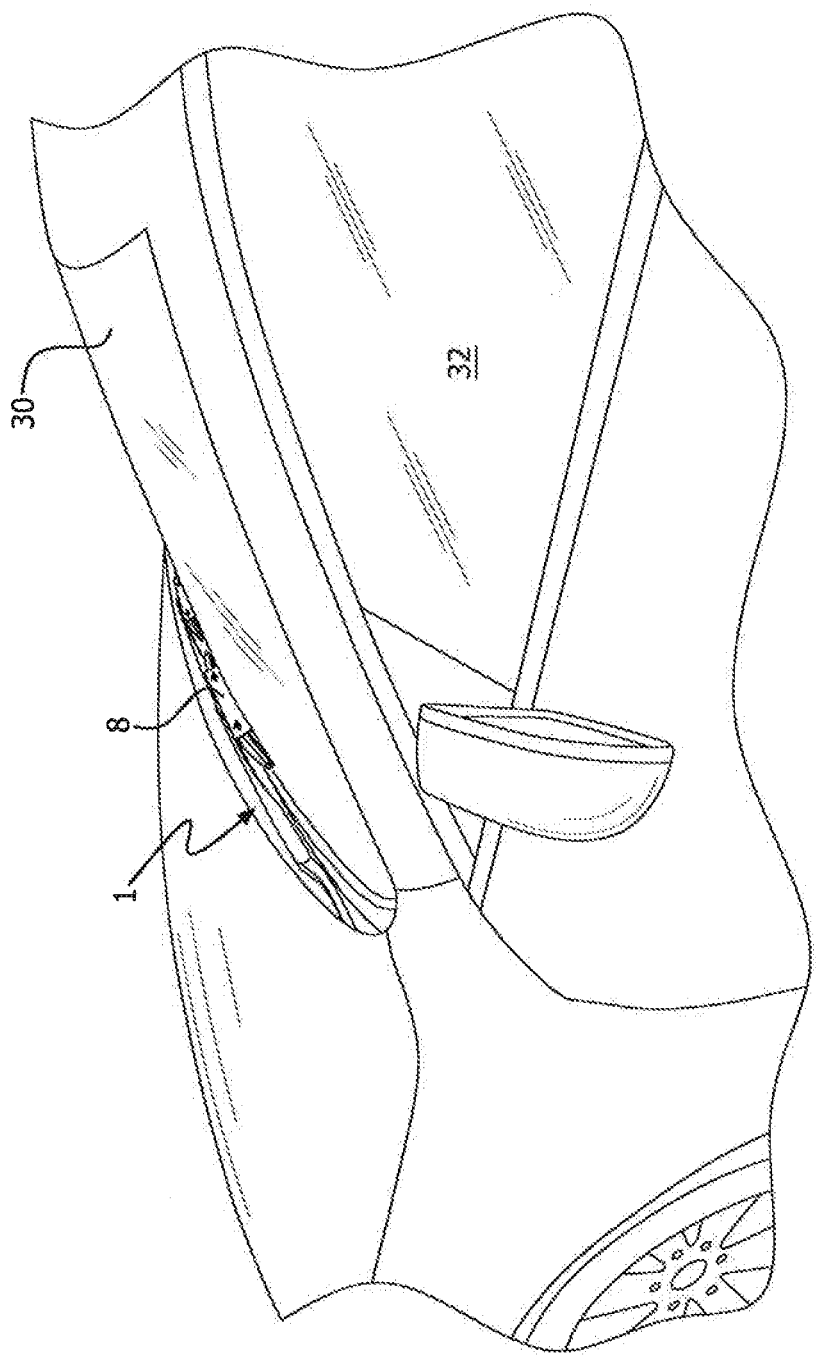
FIG. 1 is a perspective view of the windshield wiper of the present invention as it is positioned on the windshield of a motor vehicle.
Figure 5:
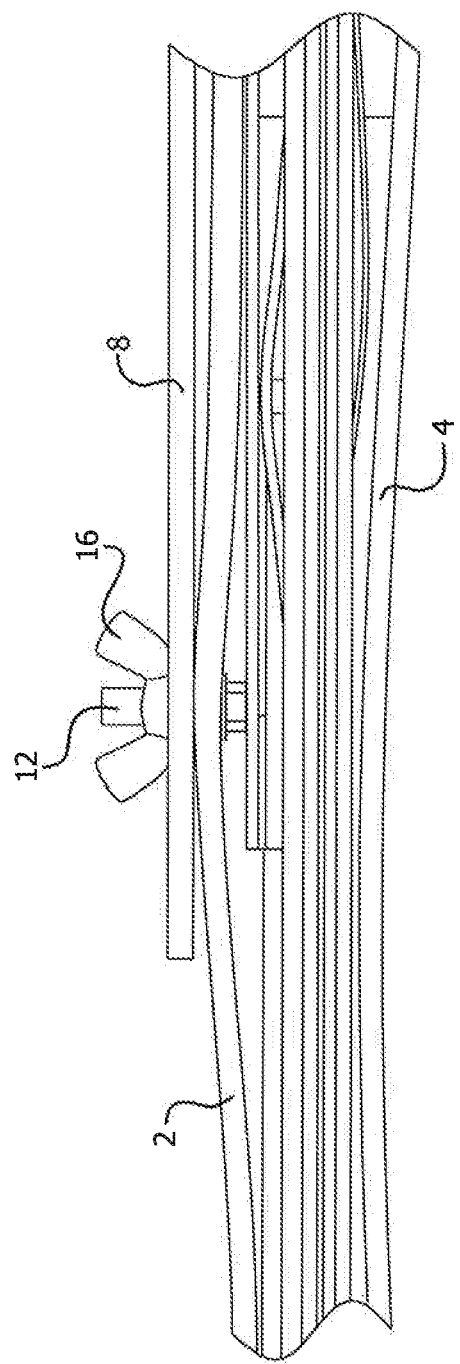
FIG. 5 is a cross-section, taken from FIG. 2.

Windshield wiper 1 of the present invention comprises an upper wiper support arm 2 fixedly secured to water clearing blade 4. Blade 4 is made of rubber or equivalent flexible resilient material. Support arm 2 of windshield wiper 1 also comprises ice scraper component 8, at all times located above both the support arm and blade 4. Attachment means, in the form of screws 12 and 14 and corresponding threaded wing nuts 16 and 18, are provided to join and connect these windshield wiper components. Screws 12 and 14 extend through support arm 2 of windshield wiper 1 to blade 4 to fixedly connect the support arm to the blade. Screws 12 and 14 are positioned in fore and aft extending slots 20 and 22 through scraper component 8, to maintain the scraper component in position atop the support arm. Upon threading of wing nuts 16 and 18 around screws 12 and 14, scraper component 8 is tightly held against support arm 2.

Outer edges 24 and 26 of blade 4 and scraper component 8 are both curved so as to be configured to the shape of windshield 30 of the vehicle 32. The radii of curvature of outer edges 24 and 26 are substantially the same, as best seen in FIGS. 2-4.

When scraper component 8 is to be used to scrape ice and frozen snow off windshield 30, wing nuts 16 and 18 are loosened from threaded screws 12 and 14. This allows scraper component 8 to be slid forward of blade 4, along screws 12 and 14 positioned in slots 20 and 22 of the scraper component. Scraper component 8 is slid forward enough so that its curved surface 22 contacts windshield 30 and blade 4 is not in contact with the windshield. See FIG. 4. Wing nuts 16 and 18 are then tightened around screws 12 and 14 to secure scraper component 8 in this first position on support arm 2. Upon actuation of windshield wiper 1, scraper component 8 is then effective in successfully scrapping off and removing ice and frozen snow from windshield 30.

When scraper component 8 is no longer needed to remove frozen precipitation, wing nuts 16 and 18 are again loosened from screws 12 and 14. Scraper component 8 is then slid rearward, along screws 12 and 14 positioned in slots 20 and 22 of the scraper component, so that its curved surface 22 no longer contacts windshield 30. See FIG. 3. Wing nuts 16 and 18 are then tightened around screws 12 and 14 to secure scraper component 8 in its retracted position on support arm 2 of windshield wiper 1. In this second position, only curved outer edge 24 of blade 4 contacts windshield 30, thus allowing windshield wiper 1 to resume its normal windshield water clearing function.

The present invention thus provides a novel windshield wiper which can not only be utilized for normal windshield water clearing purposes, but also can readily and simply be converted for scraping ice and frozen snow off the windshield, without damaging the resilient flexible water clearing blade of the windshield wiper.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A windshield wiper for a windshield of a vehicle comprising:
   a wiper support arm comprising a flexible, resilient blade for clearing water from the windshield of the vehicle;
   an ice scraper component at all tin located above, maintained atop, and connected to the wiper support arm and the water clearing blade, said ice scraper component being made of a rigid, hard material; and
   attachment means for fixedly connecting the wiper arm and the water clearing blade and for adjustably connecting the water clearing blade to the ice scraper component in a first position in which the ice scraper component is in contact with the vehicle windshield and the water clearing blade is connected to the ice scraper and is not in contact with the windshield, and for fixedly connecting the wiper arm and the water clearing blade and for adjustably connecting the water clearing blade to the ice scraper in a second position in which the ice scraper component remains connected to the water clearing blade and is slid away, retracted from, and is not in contact with the windshield and the water clearing blade is in contact with the windshield.

2. The windshield wiper for a vehicle windshield as in claim 1 wherein the water clearing blade and ice scraper component both have outer edges which are curved to conform to the shape of the vehicle windshield.

3. The windshield wiper for a vehicle windshield as in claim 2 wherein the radii of curvature of the outer edges of the water clearing blade and the ice scraper component are substantially the same.

4. The windshield wiper for a vehicle windshield as in claim 1 wherein the attachment means comprises screws and wing nuts, the wing nuts being tightened around the screws to maintain the water clearing blade and ice scraper component in fixed relation to each other in said first and second positions, and are loosened to allow the water clearing blade and ice scraper component to be moved between said first and second positions.

5. The windshield wiper for a vehicle windshield as in claim 4 wherein the ice scraper component comprises slots into which the screws are positioned, whereby said scraper component is slideable along the screws between said first and second positions.

6. The windshield wiper for a vehicle windshield as in claim 5 wherein the water clearing blade and ice scraper component both have outer edges which are curved to conform to the shape of the vehicle windshield.

7. The windshield wiper for a vehicle windshield as in claim 6 wherein the radii of curvature of the outer edges of the water clearing blade and the ice scraper component are substantially the same.

8. The windshield wiper for a vehicle windshield as in claim 1 wherein the ice scraper component comprises slots into which the attachment means are positioned, whereby said ice scraper component is slideable along the attachment means between said first and second positions.

9. A windshield wiper for a windshield of a vehicle comprising:
   a wiper support arm comprising a flexible, resilient blade for clearing water from the windshield of the vehicle;
   an ice scraper component located above both the wiper arm and the water clearing blade, said ice scraper component being made of a rigid, hard material; and
   attachment means for fixedly connecting the wiper arm and the water clearing blade and adjustably connecting the water clearing blade to the ice scraper component in a first position in which the ice scraper component is in contact with the vehicle windshield and the water clearing blade is not in contact with the windshield, and a second position in which the ice scraper component is slid away, retracted from, and is not in contact with the windshield and the water clearing blade is in contact with the windshield, the attachment means comprising screws and wing nuts, the wing nuts being tightened around the screws to maintain the water clearing blade and ice scraper component in fixed relation to each other in said first and second positions, and are loosened to allow the water clearing blade and ice scraper component to be moved between said first and second positions.

10. The windshield wiper for a vehicle windshield as in claim 9 wherein the water clearing blade and ice scraper component both have outer edges which are curved to conform to the shape of the vehicle windshield.

11. The windshield wiper for a vehicle windshield as in claim 10 wherein the radii of curvature of the outer edges of the water clearing blade and the ice scraper component are substantially the same.

12. The windshield wiper for a vehicle windshield as in claim 9 wherein the ice scraper component comprises slots into which the attachment means are positioned, whereby said ice scraper component is slideable along the attachment means between said first and second positions.

13. The windshield wiper for a vehicle windshield as in claim 9 wherein the ice scraper component comprises slots into which the screws are positioned, whereby said scraper component is slideable along the screws between said first and second positions.

14. The windshield wiper for a vehicle windshield as in claim 13 wherein the water clearing blade and ice scraper component both have outer edges which are curved to conform to the shape of the vehicle windshield.

15. The windshield wiper for a vehicle windshield as in claim 14 wherein the radii of curvature of the outer edges of the water clearing blade and the ice scraper component are substantially the same.

* * * * *